United States Patent
Natarajan et al.

(10) Patent No.: US 11,705,750 B2
(45) Date of Patent: Jul. 18, 2023

(54) POWER NEGOTIATION SEQUENCE TO IMPROVE USER EXPERIENCE AND BATTERY LIFE

(71) Applicant: Intel Corporation, Santa Clara, CA (US)

(72) Inventors: Udaya Natarajan, El Dorado Hills, CA (US); Kannappan Rajaraman, Bangalore (IN); Venkat Jayaraman, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 17/125,814

(22) Filed: Dec. 17, 2020

(65) Prior Publication Data
US 2021/0408803 A1    Dec. 30, 2021

(30) Foreign Application Priority Data
Jun. 25, 2020  (IN) .............................. 202041026854

(51) Int. Cl.
*H02J 7/00* (2006.01)
*G06F 1/3212* (2019.01)
(Continued)

(52) U.S. Cl.
CPC ............ *H02J 7/007* (2013.01); *G06F 1/3212* (2013.01); *G06F 1/3287* (2013.01); *G06F 9/4401* (2013.01); *H02J 7/0042* (2013.01)

(58) Field of Classification Search
CPC ...... H02J 7/007; H02J 7/0042; H02J 2207/30; H02J 7/00034; G06F 1/3212; G06F 1/3287; G06F 9/4401; Y02D 10/00
See application file for complete search history.

(56) References Cited

U.S. PATENT DOCUMENTS 11,093,020 B2 *  8/2021  Kadgi ................ G06F 13/4282
11,569,655 B2 *  1/2023  Lin .......................... H02H 7/22
(Continued)

OTHER PUBLICATIONS

Office Action dated Mar. 9, 2022 for Indian Application No. 202041026854, 6 pages.

*Primary Examiner* — Stacy Whitmore
(74) *Attorney, Agent, or Firm* — Schwabe, Williamson & Wyatt, P.C.

(57) ABSTRACT

A power sequence in a power-delivery (PD) mechanism (interaction between host system components and a charger) and a firmware sequence during power contract negotiation reduces the host system power consumption at or below the pSnkStdby power limit to improve user experience and battery life. The power sequence uses USB Type-C PD protocol and timing specification to implement a synchronous trigger or interrupt and interface mechanism. The synchronous trigger or interrupt and interface mechanism between a PD controller and an embedded controller firmware controls the power consumption dynamically during the boot flow sequence to be less than or equal to pSnkStdby power limit while implementing a predictable boot sequence and optimizing boot time. The power negotiating sequence is also applicable when a source (e.g., a charger) is connected to a SoC host system which is in active state (e.g., S0) and when there is an indication of low battery capacity.

20 Claims, 4 Drawing Sheets

(51) Int. Cl.
*G06F 1/3287* (2019.01)
*G06F 9/4401* (2018.01)

(56) References Cited

U.S. PATENT DOCUMENTS

| | | | | |
|---|---|---|---|---|
| 11,579,897 | B2* | 2/2023 | Bartfai-Walcott | ............................ G06F 11/3058 |
| 2015/0355696 | A1* | 12/2015 | Pamley | ................ G06F 1/3203 713/300 |
| 2016/0285757 | A1* | 9/2016 | Srivastava | ............ H04L 45/566 |
| 2016/0364360 | A1* | 12/2016 | Lim | ................... G06F 13/4282 |
| 2017/0046299 | A1* | 2/2017 | Isaac | ................... G06F 13/4282 |
| 2017/0126041 | A1* | 5/2017 | Sato | ........................ H02M 3/04 |
| 2017/0139467 | A1* | 5/2017 | Waters | ................. G06F 13/385 |
| 2017/0140887 | A1* | 5/2017 | Waters | ................... G06F 1/266 |
| 2017/0277251 | A1* | 9/2017 | Gong | ........................ G06F 1/28 |
| 2017/0293335 | A1* | 10/2017 | Dunstan | ................. H02J 50/10 |
| 2017/0358891 | A1* | 12/2017 | Peng | .................. H01R 13/6691 |
| 2018/0074574 | A1* | 3/2018 | Camiolo | ............. G06F 13/4282 |
| 2018/0123594 | A1* | 5/2018 | Kim | ............... H03K 19/018592 |
| 2018/0254650 | A1* | 9/2018 | Wang | .................. H02J 7/00047 |
| 2019/0058346 | A1* | 2/2019 | Lu | ............................. H02J 7/34 |
| 2019/0140646 | A1* | 5/2019 | Durham | .............. H03K 17/302 |
| 2019/0354163 | A1* | 11/2019 | Bodnaruk | ........... G06F 13/4282 |
| 2020/0073349 | A1* | 3/2020 | Yamaya | .................. H02J 7/0045 |
| 2020/0083740 | A1* | 3/2020 | Sultenfuss | ................ H02J 7/34 |
| 2020/0166980 | A1* | 5/2020 | Wu | ..................... H02J 7/00038 |
| 2020/0403433 | A1* | 12/2020 | Chung | .................. G06F 11/327 |
| 2021/0109580 | A1* | 4/2021 | Tseng | .................... H01H 47/00 |
| 2021/0109884 | A1* | 4/2021 | Lagnado | ............ G06F 13/4068 |
| 2021/0232196 | A1* | 7/2021 | Sultenfuss | ................ H02J 7/02 |
| 2021/0232202 | A1* | 7/2021 | Sultenfuss | .............. H02J 1/084 |
| 2022/0066980 | A1* | 3/2022 | Khamesra | ................ G06F 1/08 |
| 2022/0086553 | A1* | 3/2022 | Shan | ........................ H02J 50/80 |
| 2022/0164432 | A1* | 5/2022 | Moritomo | .............. G06F 21/81 |
| 2022/0404891 | A1* | 12/2022 | Wang | ................... G06F 1/3275 |

* cited by examiner

POWER NEGOTIATION SEQUENCE TO IMPROVE USER EXPERIENCE AND BATTERY LIFE

CLAIM FOR PRIORITY

This application claims the benefit of priority to Indian Patent Application No. 202041026854, filed on Jun. 25, 2020, titled "POWER NEGOTIATION SEQUENCE TO IMPROVE USER EXPERIENCE AND BATTERY LIFE," and which is incorporated by reference in entirety.

BACKGROUND

A Universal Serial Bus (USB) Type-C Power Consumer Sink, such as a mobile system-on-chip (SoC) host personal computer (PC) device, is expected to draw power less than or equal to a threshold power, pSnkStdby, during transitioning to a new VBUS Source voltage. The power delivery (PD) specification of the USB Type-C specifies this limit or threshold so an external source, such as wall charger, can manage the voltage transition while supplying minimal operating current for the platform. This reduces voltage overshoot transients and inrush current and avoid system shutdown while establishing power contract between the Sink and Source. Compliance of pSnkStdby power threshold during transitioning to a new VBUS Source voltage improves user experience by avoiding uneventful shutoff due to battery overload and thus extends battery life.

Mobile SoC host systems do not have a defined mechanism to control the SoC system power consumption during the Type-C Power contract or negotiation establishment. As such, user experience is worst when a Source, e.g., a charger, is connected to a system and booted with a dead battery condition. Peak power demand during boot sequence coupled with no battery power leads to platform resets many times during a boot process.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
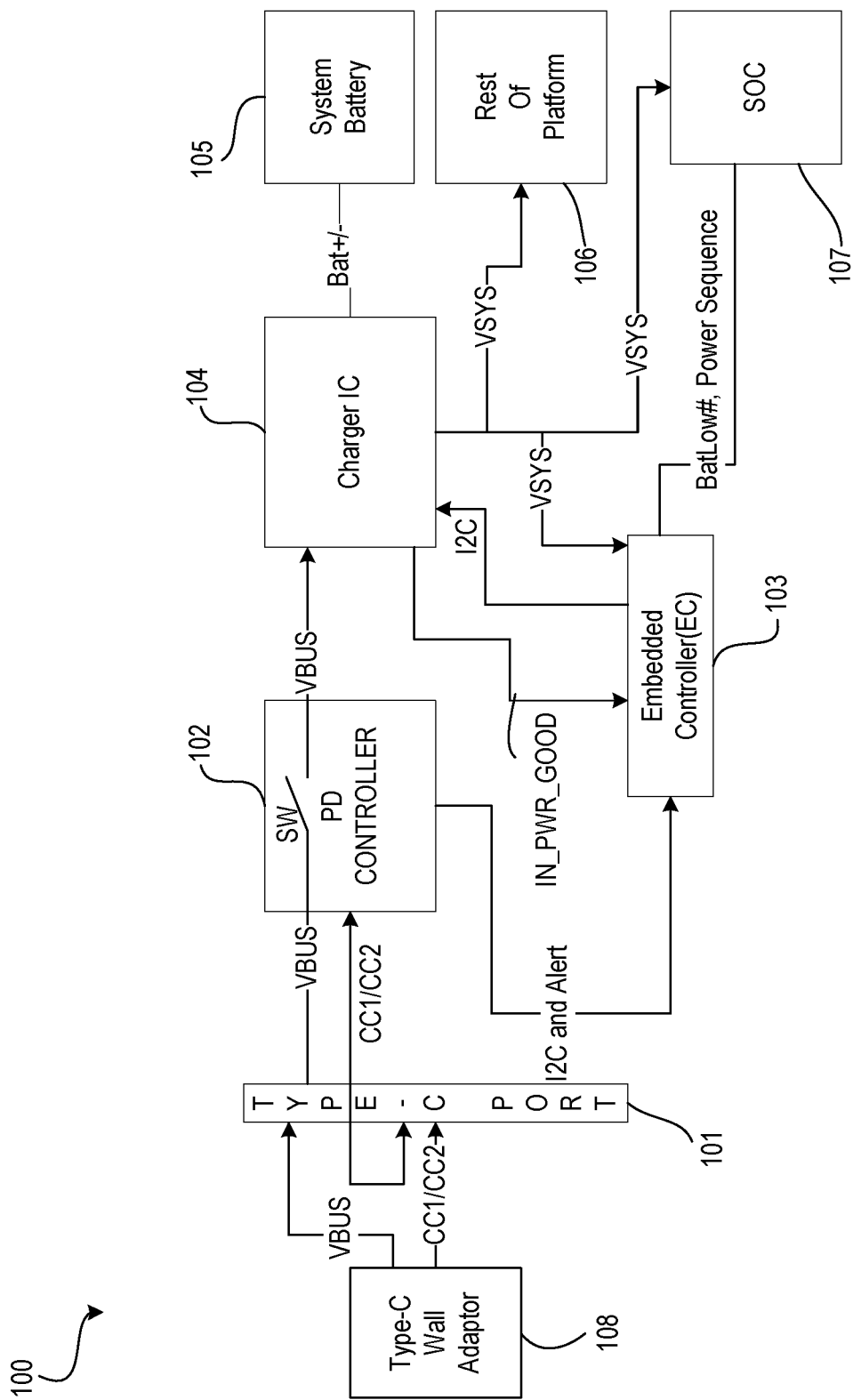
FIG. 1 illustrates a platform power delivery (PD) architecture, in accordance with some embodiments.

Currently there are no proper protocols or hardware interface implemented in mobile SoC host systems to reduce power consumption at or below the pSnkStdby power limit or threshold of the host system. A common usage case is for a user to find through a "Low Battery Indicator" that a charger should be connected to the mobile SoC host system. Usually the "Low Battery Indicator" has enough guard band to power the system when the charger is connected. At such time when the user connects to the external power source (e.g., a wall charger) and there is ongoing Type-C Power contract establishment or negotiation, the SoC host system consumes more power than the pSnkStdby power limit.

While the battery energy and/or capacity guard band handles the power delivery beyond the pSnkStdby power limit to the SoC host system, there can still be voltage spikes and current surges during this phase across the charger source and the sink (e.g., SoC host system) which may be detrimental for the computer board components and battery life. For example, when the SoC host system is performing at full capacity, there are good chances for voltage spikes, surges that can transition beyond the system guard thresholds. In this case, the SoC host system can reinitiate a hardware reset and reboot, which results in bad user experience. This problem described herein is also applicable when the SoC host system is in an active state such as S0 state as defined by the Advanced Configuration and Power Interface (ACPI) specification version 6.3 of January 2019.

Another disadvantage of not having a defined mechanism to control the SoC host system power consumption during a Type-C Power contract or negotiation establishment is that when a source (e.g., a charger) is connected and the SoC host system is boots with good battery condition (e.g., a batter having more that 30% charge), the problem is compounded by the absence of any software or firmware to synchronize and control the power consumed by SoC host platform to be within the pSnkStdby power limit when the power contract is being established during the SoC host system boot phase. Power consumed by the SoC host system peaks during the boot sequence due to the absence of power management features at boot time. In this case, the SoC host system can reinitiate a hardware reset and reboot, which results in bad user experience.

Another disadvantage of not having a defined mechanism to control the SoC host system power consumption during a Type-C Power contract or negotiation establishment is that when a source (e.g., a charger) is connected and the SoC host system is booted with dead battery condition. In this case, peak power demand during boot sequence coupled with no battery power leads to SoC host platform resetting many times during the boot phase.

Various embodiments provide a sequence in the power delivery (PD) mechanism, interaction between SoC components and the charger, and firmware sequence during power contract negotiation to reduce the SoC host system power consumption at or below the pSnkStdby limit to improve user experience and battery life. The power negotiating sequence of various embodiments meets the more stringent requirement when the source (e.g., a charger) is connected and SoC host system is booted with a dead battery. The sequence of various embodiments utilizes the USB Type-C PD protocol and timing specification to implement a synchronous trigger or interrupt and interface mechanism.

In various embodiments, the synchronous trigger or interrupt and interface mechanism between a PD controller and an embedded controller (EC) firmware controls the power consumption dynamically during the boot flow sequence to be less than or equal to pSnkStdby power limit. The power negotiating sequence of various embodiments is also applicable when a source (e.g., a charger) is already connected to a mobile SoC host system which is in active state (e.g., S0 state) and when there is an indication of low battery capacity. A user is likely to connect a charger at this stage. Various embodiments describe a mechanism to trigger the SoC host system to lower its power state during Type-C power contract establishment between the source and sink. The mechanism allows for the platform power consumption during this phase to be less are equal to the pSnkStdby power limit.

While the various embodiments are described with reference to USB Type-C PD, the power sequence is also applicable to any electronic equipment which needs power delivery from a charger.

The power negotiating sequence of various embodiments optimizes decision to optimize boot time of SoC 107 based on platform power requirements with pSnkStdby PD specification limits. A synchronous trigger is provided with respect to PD protocol messages translating to platform EC. PD protocol messages used to trigger a boot and to maintain the pSnkStdby power specification limits include: POWER_STATUS, CC_PIN_STATUS, Power negotiation ACCEPT, PS_RDY, and RDO-PDO objects of the USB Type-C PD specification. The sequence for power negotiating comprises two stages. In the first stage, a non-PD implicit contract is formed. In the second stage, a PD based explicit contract is formed.

In the first stage (stage 1), a latched alert is received from PD to EC, in the host system, based on termination impedance on the CC pins. EC firmware decides to delay or optimize the SoC or EC boot delay based on PD CC pull-up and/or pull-down electrical terminations. The status of the CC pins is stored in CC_PIN_STATUS and/or POWER_STATUS PD registers.

In the second stage (stage 2), EC firmware throttles the processor or SoC based on PD protocol ACCEPT latched Alert interrupt and/or battery capacity. EC firmware operates the platform at the maximum power based on the PD protocol PS_RDY latched interrupt. In dead battery cases, EC charging (trickle or fast charging) and booting firmware makes a decision based on implicit non-PD protocol (e.g., CC_PIN_STATUS–Rp, POWER_STATUS) and battery capacity. In some embodiments, EC firmware maintains PD Protocol pSnkStdby with controlled charging and opportunity to boot the platform early. When the processor or SoC is in active operation (e.g., state S0), EC firmware applies the sequences of stage 1 and stage 2 and maintains platform operating conditions without affecting user experience, and increasing battery life.

There are many technical effects of various embodiments. For example, the power sequence of various embodiments solve the electrical voltage spikes and current surges, comply with Type-C PD specification, extend battery life, increase host system reliability, and improve user experience of a mobile SoC host system. The power negotiating scheme of various embodiments improves EC housekeeping activities such as flashing and trickle charging. User experience is improved by avoiding unwanted shutdowns of the computing devices. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" here generally refers to any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates a platform power delivery (PD) architecture 100, in accordance with some embodiments. Architecture 100 comprises USB Type-C port 101, PD controller 102 having switch SW, embedded controller (EC) 103, Charger integrated circuit (IC) 104, system battery 105 (e.g., battery 2418 of FIG. 4), rest of platform 106 (e.g., various components of device 2400 of FIG. 4), SoC 107 (e.g., SoC 4101 of FIG. 4), and Type-C wall adaptor 108 (or high-power charger 108) coupled as shown. Power delivery controller 102 (PD controller) and/or EC 103 negotiates the power requirements from the source (e.g., charger 108). Depending on the negotiation, VBUS power supply rail provides the power from source charger 108 to Charger IC 104. Charger IC 104 charges system battery 105 and uses power from battery 105 and/or power from VBUS to generate system power supplies such as VSYS for SOC 107 and the rest of platform 106. In various embodiments, PD controller 102 issues one or more interrupts (e.g., first interrupt upon connection of charger 108, and second interrupt upon reception of an acceptance message from charger 108) or Alert message to the EC controller 103 to negotiate the power contract. This communication can be using any communication fabric. One such fabric is I2C I/O interface. In some embodiments, EC 103 upon receiving an internal power good indication (IN_PWR_GOOD) from Charger IC 104, initiates a power-up sequence for SoC 107. In some embodiments, based on low battery power indication via bit BATLOW #, EC 103 and/or PD controller 102 negotiates power contract for the host system. Here, host system comprises the one or more components to the right of Type-C Port 101.

When a high-power charger 108 is plugged in to port 101, the sink port of PD controller 102 negotiates power in 2 stages. The first stage (stage 1) forms the implicit contract for power delivery. The second stage (stage 2) forms the explicit contract for power delivery.

The first stage is based on the Type-C CC Rp (pull-up) termination (or pull-down termination) of the source port (e.g., CC1/CC2 pins) defined by the USB Type-C specification. There is minimal PD controller firmware and protocol involved in this contract between the source (e.g., charger 108) and sink port partners (e.g., PD controller 102). The Sink port PD controller 102 (e.g., host system PD controller) determines the sinking current based on the termination. The Sink Port PD controller 102 closes the Sink path via switch SW. As such, Sink Port PD controller 102 closes enables the host system to consume the power from the Source port charger adaptor 108. In this stage, based on pull-up or pull-down termination on CC1/CC2 pins, PD controller 102 assumes the power requirements for the sink. Messages between wall adapter or charger 108 and PD controller 102 are via CC1/CC2 pins as defined by the USC Type-C PD specification 3.0.

In the second stage, once the implicit contract from stage 1 is completed, Source PD controller 102 sends the power capabilities to charger 108. PD controller firmware and protocol are involved in this contract between the Source and Sink port partners. Here, sink port partners are one or more components (e.g., PD controller 102, EC 103, etc.) to the right side of Type-C port 101. Sink port partner is also referred to as the USB host system. Here, source port partners are one or more components (e.g., wall adaptor 108) to the left side of Type-C port 101. Source port partner is also referred to as the USB source or charger.

Based on Source advertised capabilities, sink PD controller 102 chooses the required power based on the platform policy and negotiates for the required power levels from the source 108. This is called power contract negotiation and establishment. USB PD specification mandates for the Sink Port to draw no more than pSnkStdby (e.g., 2.5 W) power whenever there are changes in VBUS voltage/current (e.g., lower power to higher power transition and vice versa) during the power contract negotiation. The sequence of power contract negotiation between the source (e.g., charger 108) and sink (e.g., mobile SoC host system comprising PD controller 102, EC 103, charger IC 104, SoC 107, etc.) and the VBUS voltage transition is provided in the USC Type-C PD specification 3.0.

Figure 2:
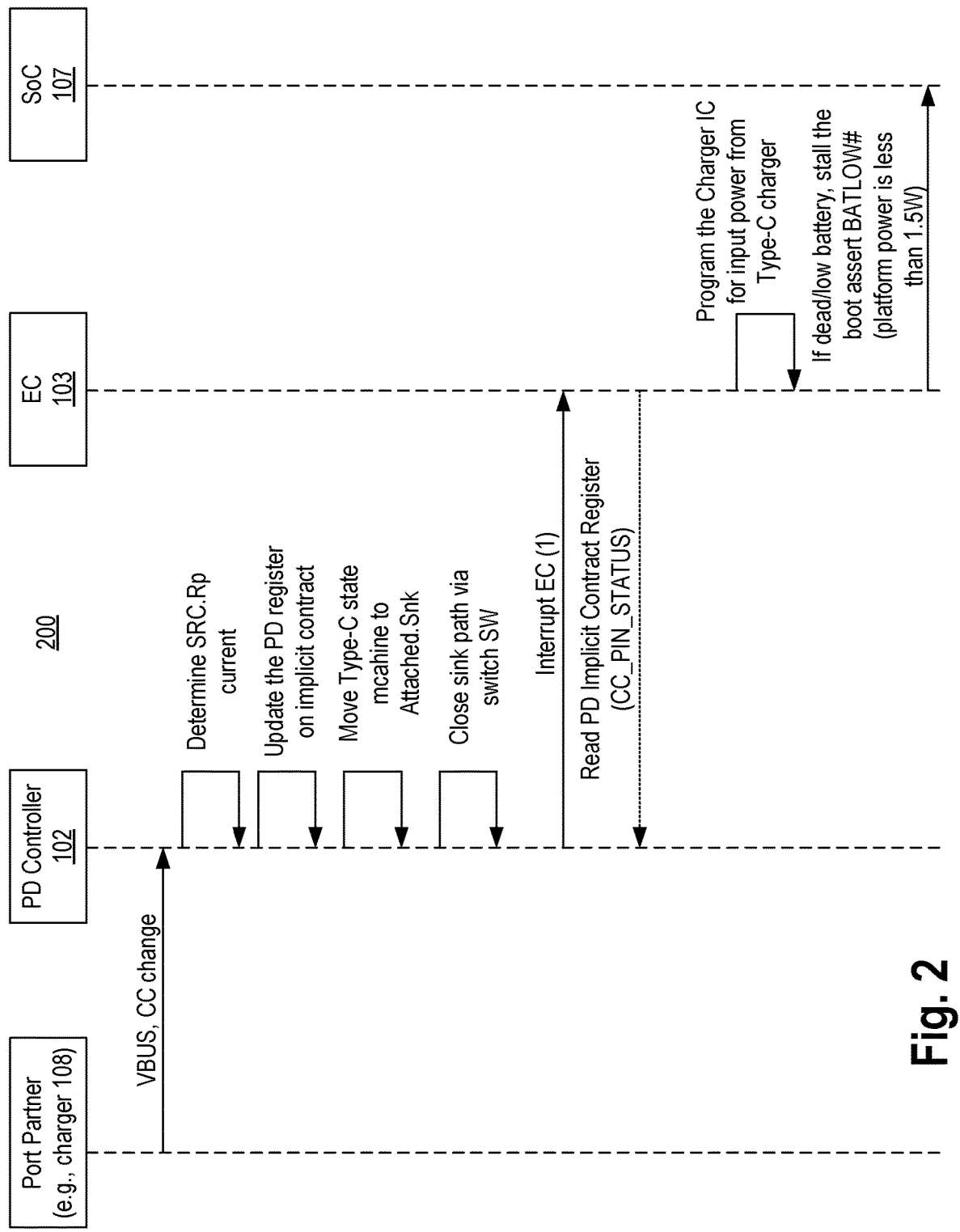
FIG. 2 illustrates a flowchart for stage 1 charge source port partner and host system-on-chip (SoC) sink PD and embedded controller (EC) interaction, in accordance with some embodiments.

FIG. 2 illustrates flowchart 200 for stage 1 charge source port partner and host system-on-chip (SoC) sink PD and embedded controller (EC) interaction, in accordance with some embodiments. Flowchart 200 illustrates platform power sink sequence between PD controller 102 and EC 103 handshake during each stage of Type-C power negotiation.

In stage 1 (implicit contraction formation), after Rp/Rd (pull-up/pull-down termination) implicit contact is completed, sink port PD controller 102 closes the sink path via switch SW. This allows the VBUS to reach platform charger IC 104.

The sequence is numbered by numbers (1), (2), (3), and onwards. The stage 1 sequence begins with (1) PD controller 102 providing a latched alert or interrupt to EC 103. Once sink path is closed, the connected charger 108 powers up (2) the platform, which allows the platform EC 103 to boot. In some embodiments, EC controller firmware services the PD interrupt (or Alert) after EC 103 boots. Firmware of EC 103 then services (3) the PD interrupt after EC 103 boots.

A firmware sequence is provided where by the time EC 103 boots, Sink PD controller 102 updates (4) CC_PIN_STATUS or POWER_STATUS register with USB default negotiated implicit power (e.g., USB 1.5 A/3 A). The time span required from first connect to sink port PD implicit contract to complete (5) along with PD CC_PIN_STATUS or POWER_STATUS register update is typically within tSrcReady time (e.g., 250 ms) as per USB Type-C PD specification. In some embodiments, EC firmware reads (6) the CC_PIN_STATUS or POWER_STATUS to determine the power capability of the partner device. EC 103 configures charger ILIM pin (pin that sets the input current limit) based on Source Rp termination capability to deliver power to the Platform and to charge the battery based on Source Rp (e.g., based on CC_PIN_STATUS or POWER_STATUS).

When the mobile SoC host system is booted with dead battery 105 (e.g., battery with no charge) and charger 108 is connected to Type-C port 101, sink path is enabled by host sink PD controller 102 irrespective of charger source Rp termination (Rp USB default 900 mA, Rp 1.5 A or Rp 3 A). In this case, for a typical SoC, the host platform consumption is less than 1.5 W. Handheld mobile devices (e.g., mobile phones) will draw even less power. This is well within the least Rp source capability 4.5 W (USB Default). Under this condition, EC 103 is booted and asserts BATLOW # signal to prevent further boot of SoC 107. EC 103 is configured to charge battery 105 within the power envelope provided by the source charger 108 (e.g., 1 W) at this stage with ILIM setting (as illustrated in (6)) based on source Rp capability (from CC_PIN_STATUS or POWER_STATUS).

In the case of a flash-less PD controller architecture, similar sequence is followed. The Host/Sink boot is halted by EC 103 to take a decision to continue boot, based on charger power capability logged as suggested in (5), (6) above. During this time EC 103 provisions the PD firmware update and charges the battery ILIM settings as in (6) above. This can be accomplished within the 1.5 W platform power consumption which is within the least Rp source capability of 4.5 W. Based on Rp, EC 103 configures the ILIM and enables the charging of battery 105. When battery 105 is charged to support power for the host platform boot, EC firmware which monitors the battery capacity, triggers the boot of the host SoC system. Boot sequence then proceeds to the Stage 2 (explicit contract) if the connected Source (e.g., charger 108) is PD capable.

In some embodiments, when SoC 107 is booted with good battery and charger 108 is connected (i.e., when source charger 108 is connected to the host Sink in a good battery condition (e.g., when battery charge is over 30%), EC 103 may not assert BATLOW # and so the system continues to boot. EC 103 continues to charge battery 105. Boot sequence then proceeds to the Stage 2 (explicit contract) if the connected Source (e.g., charger 108) is PD capable.

Figure 3:
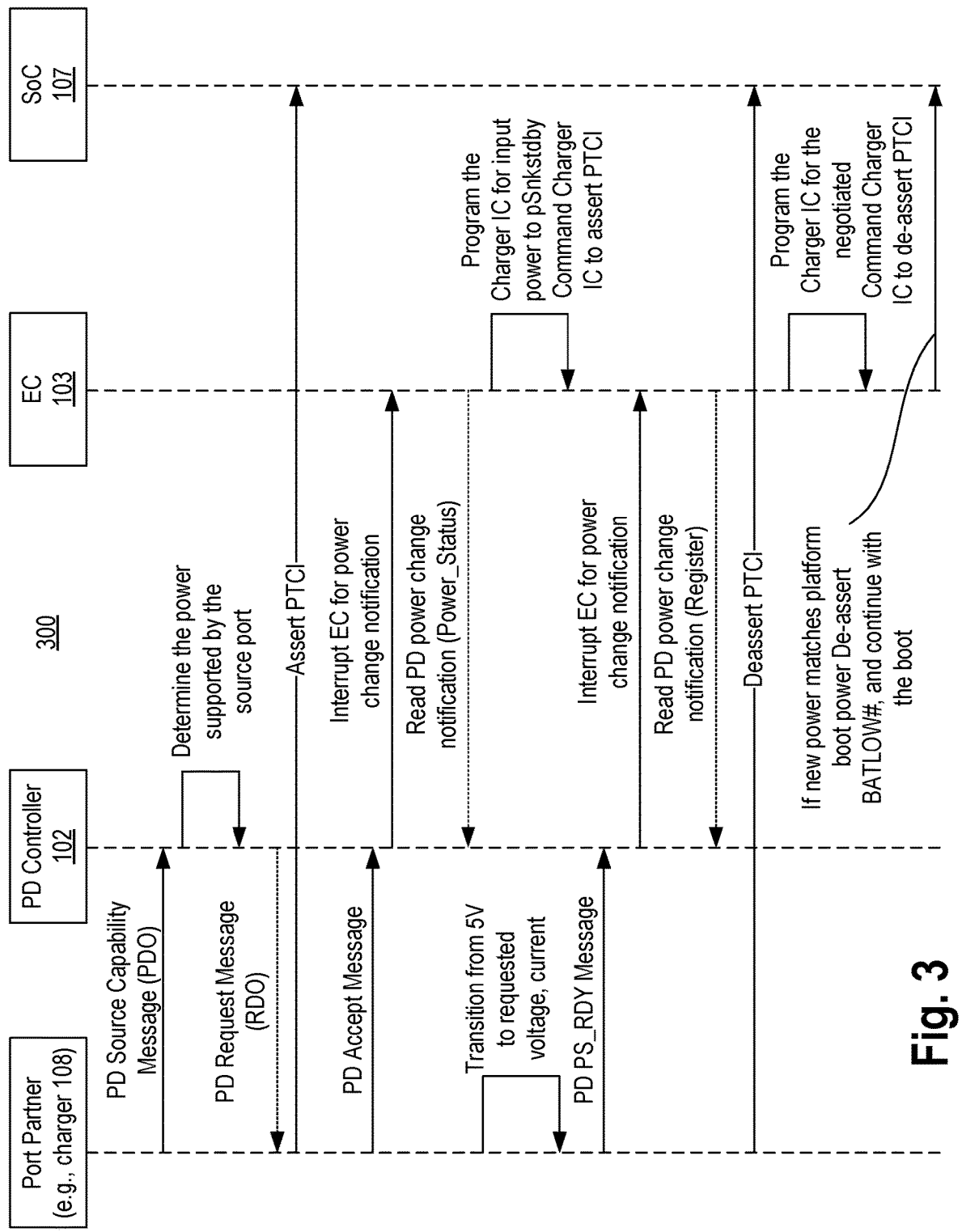
FIG. 3 illustrates a flowchart for stage 2 charge source port partner and host SoC sink PD and EC interaction, in accordance with some embodiments.

FIG. 3 illustrates flowchart 300 for stage 2 charge source port partner and host SoC sink PD and EC interaction, in accordance with some embodiments. Once the Stage 1 Implicit contract is finished (as discussed with reference to FIG. 2), Charger Source port PD controller (e.g., part of charger 108) shall start advertising its power capabilities. Timespan for the Source PD controller to start the advertisement is tFirstSourceCap (e.g., 250 ms) from the time Source port enables VBUS (part of implicit contract).

Host Sink port PD controller 102 waits for the advertisement for a timespan of tTypeCSinkWaitCap (e.g., 310-620 ms). If Sink port (e.g., PD controller 102) does not receive the advertisement during this time, it will try a Hard Reset. In one example, it takes 310-620 ms for the Sink port to move from Stage 1 implicit contract negotiation to Stage 2 explicit contract negotiation. For the Sink port PD controller 102 to evaluate the capabilities and complete the negotiation, the USB Type-C PD specification allows time span of tPSTransistion (e.g., 450-550 ms) from the start of Sink evaluating ACCEPT and later PS_RDY message that comes from charger Source Port (part of charger or adaptor 108).

As recommended by the USB Type-C PD specification, platform draws a maximum pSnkStdby power during the voltage transitions (while switching from Stage 1 implicit contract formation to Stage 2 explicit contract formation). Sink port PD controller 102 decides the optimal time to switch to higher explicit contract when the Host SoC platform power consumption is less than or equal to pSnkStdby power threshold. Holding booting of the System for a short time (e.g., approximately 1 sec by adding the two time delay 620+550 ms) from first connect may not provide a good user experience. This limitation is overcome by Sink port PD controller 102 sending an Alert or interrupt to EC 103 when an ACCEPT message is received from source port PD (part of charger 108).

The sequence for stage 2 is numbered by numbers (7), (8), (9), and onwards. Sequence (7) begins with EC 103 having been booted due to stage 1 implicit contract formation. At sequence (8), the host system decides the process of boot or no boot based on stage 1 dead or good battery condition. At sequence (9), Sink port PD controller 102 provides Latched Alert Interrupt to EC 103 on Reception of ACCEPT PD message from Charger Source 108 and update a Sink PD Register Accept Bit. EC firmware services the PD interrupt and reads that the PD ACCEPT Bit message that is received from Source Charger PD (part of charger or adaptor 108). At sequence (10), EC 103 now knows an explicit contract has started and it begins to reduces Host platform power consumption less than or equal to the pSnkStdby power limit. At sequence (11), EC firmware shuts off charger ILIM limit to bring down host SoC platform power consumption less than or equal to pSnkStdby power limit. At sequence (12), EC firmware reads a host PD controller RDO/PDO registers, and PS_RDY to make a decision to boot the host system based on PD Alert/interrupt to EC 103. At sequence (12), the EC firmware configures the ILIM and charging based on the new power.

Sink Port PD adds and update ACCEPT bit received in the Power Status register. This register is read by EC 103. Upon confirming this event from the sink port PD controller 102, EC 103 setups the charger IC ILIM (input current limit) to zero (or to substantially zero). This enables the platform, to achieve pSnkStdby limit to meet USB PD specification requirements.

When the Accept message is acknowledged, Sink port PD controller 102 asserts Processor Throttle Control Indication (PTCI), or a throttle indication, to the SoC 107, to throttle the frequency and/or supply voltage of SoC 107 and hence limits the power taken from the Source (e.g., Charger or adaptor 108). EC 103 instructs the platform charging controller (i.e., Charger IC 104) to assert the Processor Throttle Control Indication (PTCI), which is wired OR, with the PD indication. By this method, charger IC 104 indicates to SoC 107 that there is a momentary reduction in power from Source charger or adaptor 108 and hence SoC 107 and platform has to depend on the battery power from battery 105. After this indication, EC 103 sets the ILIM register to zero, thus disabling battery charging.

Once PS_RDY message is received from the Source Port PD controller (e.g., part of charger or adaptor 108), Sink port PD 102 alerts EC 103 with power status update in the PD register. EC 103 reads the PD POWER_STATUS update register. Based on the new negotiated power indicated by the PS_RDY status, EC 103 updates the Charger IC ILIM register.

When SoC 107 is booted with a dead battery and charger 108 is connected, platform would not have booted, due to EC 103 asserting the BATLOW # as part of the Stage 1 implicit contract. EC 103 shuts off charging ILIM as in sequence 5, 6, 8, 10 and 11 above so platform power consumption is well within the pSnkStdby limit. EC 103 shall evaluate the new power status and evaluate the negotiated power by reading the Sink port PD 102 by reading the RDO/PDO register and decides on further boot. EC 103 continues to charge battery 105 at a later time based on new RDO/PDO register status. EC 103 continues to assert BAT-LOW # if the new power does not meet the minimum platform power to boot the system.

When SoC 107 is booted with good battery (e.g., battery with 30% or more charge), and charger 108 is connected, platform would have booted or in the process of boot flow. Turning the power consumption knob for the restricted pSnkStdby consumption is also done in platform S0 active state. In a good battery condition, EC 103 would have continued with the boot. In S0 active stage or SoC booted condition, EC 103 issues command to the charger IC 104 to assert the PTCI signal for SoC 107 to throttle down when EC 103 reads the "ACCEPT bit" from PD Controller 102 on an interrupt as in sequence (8). EC 103 dials down charger ILIM consumption as in sequences (10) and (11). Once the new power is negotiated, PD controller 102 sends an interrupt to EC 103 on receiving a PS_RDY from Charger PD controller (part of charger or adaptor 108).

EC 103 reads the new PDO/RDO in Sink PD controller 102 and accordingly scales the charging current to the battery. EC 103 sets the appropriate charger ILIM setting based on the negotiated PD explicit power. This enables drawing of maximum power from the charger 108 after which it de-asserts the PTCI.

USB Type-C port PD Key protocol activities (CC_PIN_STATUS, PS_RDY, ACCEPT) or power alerts are reported to the platform EC 103 by PD controller 102. This provides controllability of the Platform Power consumption. EC 103 takes corrective actions on the alerts to reduce platform power consumption to meet the pSnkstdby power limit. As such the sequence of various embodiments provides better user experience, product safety and compliance.

The scheme results in new latches, registers, and firmware for power negotiation to keep the power below the pSnkStdby power level when battery charge level falls below a threshold (fixed or programmable) or when a charger or adaptor 108 is connected to the host SoC system.

In various embodiments, PD controller 102 and EC 103 are shown as separate controllers. These controllers may be separate integrated chips. In some embodiments, PD controller 102 and EC 103 are part of a single chip. In some embodiments, Charger IC and other components of the sink host system are all integrated in one or more chips. In some embodiments, the various functions performed by PD controller 102 and/or EC 103 are via a firmware (e.g., software) provided on machine-readable storage media. The firmware is executed by PD controller 102 and/or EC 103.

In some embodiments, the machine-readable storage media comprises machine-readable instructions that when executed cause one or more integrated circuits (e.g., PD controller 102 and/or EC 103) to perform an operation comprising: negotiating implicit power contract and then negotiating an explicit power contract to keep the power consumption below the pSnkStdby power level when a battery charge level falls below a threshold (e.g., low battery or dead battery) and/or when a charger or adaptor 108 is connected to the host system.

The operation comprises: detecting connection of a charger to a host system via a pull-up or a pull-down termination impedance on one or more communication pins; and closing a switch to couple a first power supply rail with a second power supply rail in response to the detection of connection of the charger, wherein the first power supply rail is coupled to the charger, and wherein the second power supply rail is coupled to a charge circuitry.

In some embodiments, the operation comprises: issuing an interrupt (e.g., first interrupt) in response to closing the switch; servicing the interrupt after an embedded controller is booted; updating a power status register with a default first power before the embedded controller is booted; reading the power status register to determine power capability of the charger external to the host system; and configure an input current limit of the charger circuitry based on the power capability of the charger to deliver power on the first power supply rail to charge a battery. In some embodiments, the operation comprises: issuing a low battery signal to a processor to halt boot of the processor in response to detection of the charger and in response to detection of no charge of a battery; or continue booting of the processor in response to detection of the charger and in response to detection of charge of the battery.

In some embodiments, the operation comprises: receiving power capabilities from the charger on the one or more communication pins; issuing a second interrupt. upon reception of an acceptance message from the charger; updating an Accept bit register in response to reception of the acceptance message from the charger; servicing the second interrupt read the Accept bit register; and shutting off an input current limit of the charger circuitry to bring down power of the host system less than or equal to a power threshold.

Figure 4:
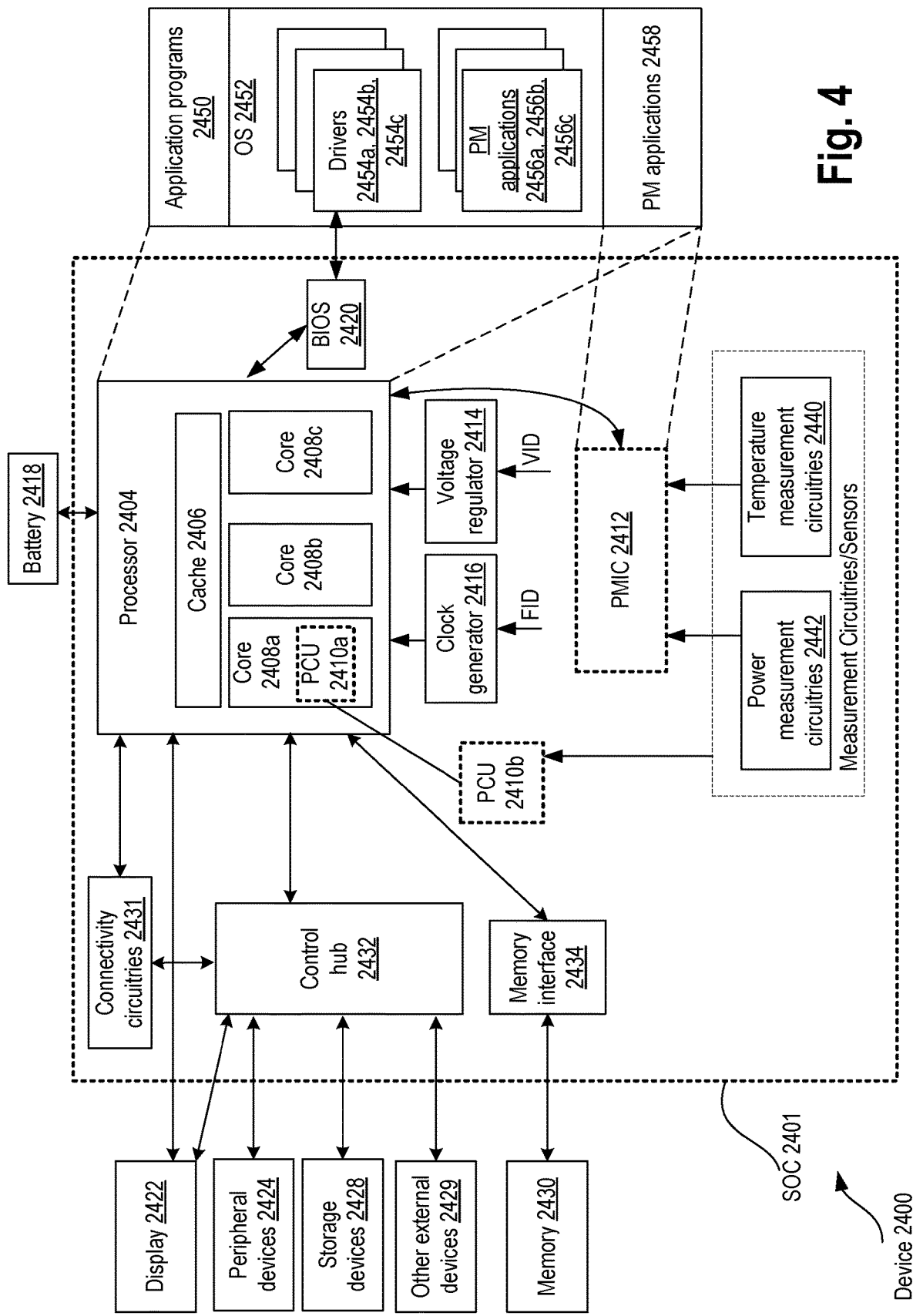
FIG. 4 illustrates a smart device or a computer system or a SoC with improve power negotiation scheme, in accordance with various embodiments.

FIG. 4 illustrates a smart device or a computer system or a SoC with improve power negotiation scheme, in accordance with various embodiments. It is pointed out that those elements of FIG. 4 having the same reference numbers (or names) as the elements of any other figure can operate or function in any manner similar to that described, but are not limited to such. In various embodiments, PD controller 102 is implemented by PMIC 2412, PCU 2410, and/or Control hub 2432. In some embodiments, system battery 105 is implemented by battery 2418. In some embodiments, embedded controller 103 is implemented by PMIC 2412, PCU 2410, and/or Control hub 2432. Type-C port 101 is implemented by interface coupling battery 2418.

In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises a SoC (System-on-Chip) 2401. An example boundary of the SOC 2401 is illustrated using dotted lines in FIG. 4, with some example components being illustrated to be included within SOC 2401—however, SOC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408a, 2408b, 2408c. Although merely three cores 2408a, 2408b, 2408c are illustrated in FIG. 4, processor 2404 may include any other appropriate number of processing cores, e.g., tens, or even hundreds of processing cores. Processor cores 2408a, 2408b, 2408c may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408a, a second section of cache 2406 dedicated to core 2408b, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 2404 may also include a bus unit to enable communication between components of processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, a cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device

2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments, and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400.

In some embodiments, memory 2430 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 2430 can be a dynamic random access memory (DRAM) device, a static random access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408a, 2408b, 2408c, voltage regulator 2414, memory 2430, a mother-board of SOC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SOC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, constant-on-time controller based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 2410*a/b* and/or PMIC 2412. In some embodiments, each core has a network of distributed LDOs to provide efficient control for power management. The LDOs can be digital, analog, or a combination of digital or analog LDOs. In some embodiments, VR 2414 includes current tracking apparatus to measure current through power supply rail(s).

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410*a*. In an example, some other sections of PCU 2410 may be implemented outside the processing cores 2408, and these sections of PCU 2410 are symbolically illustrated using a dotted box and labelled as PCU 2410*b*. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System (OS) 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456*a*, 2456*b*, 2456*c*. The OS 2452 may also include various drivers 2454*a*, 2454*b*, 2454*c*, etc., some of which may be specific for power management purposes. In some embodiments, device 2400 may further comprise a Basic Input/Output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Various embodiments described herein are illustrated as examples. The features of these examples can be combined with one another in any suitable way. These examples include:

Example 1: An apparatus comprising: one or more communication pins to couple to a charger external to the apparatus; a first a power supply rail to couple to the charger; a charger circuitry; a second power supply rail coupled to the charger circuitry; and a power delivery controller to detect connection of the charger to the apparatus via a pull-up or a pull-down termination impedance on the one or more communication pins, wherein the power delivery controller is to close a switch to couple the power supply rail with the second power supply rail in response to the detection of connection of the charger.

Example 2: The apparatus of example 1 comprising an embedded controller coupled to the power delivery controller, wherein the power delivery controller is to issue an interrupt in response to closing the switch.

Example 3: The apparatus of example 2, wherein the embedded controller is to service the interrupt after the embedded controller is booted.

Example 4: The apparatus of example 3, wherein the power delivery controller is to update a power status register with a default first power before the embedded controller is booted.

Example 5: The apparatus of example 4, wherein the embedded controller is to read the power status register to determine power capability of the charger external to the apparatus.

Example 6: The apparatus of example 5, wherein the embedded controller is to configure an input current limit of the charger circuitry based on the power capability of the charger to deliver power on the first power supply rail to charge a battery.

Example 7: The apparatus of example 6 comprising a processor coupled to the charger circuitry and the embedded controller, wherein the charger circuitry is to provide power to the processor.

Example 8: The apparatus of example 2, wherein: the embedded controller is to issue a low battery signal to a processor to halt boot of the processor in response to the detection, charger power delivery capacity and/or in response to detection of no charge of a battery; or the embedded controller is to continue boot of the processor in response to the detection, charger power delivery capacity and/or and in response to detection of charge of the battery.

Example 9: The apparatus of example 2, wherein the interrupt is a first interrupt, wherein the power delivery controller is to receive power capabilities from the charger on the one or more communication pins, wherein power delivery controller is to issue a second interrupt upon reception of an acceptance message from the charger.

Example 10: The apparatus of example 9, wherein the power delivery controller is to update an Accept bit register in response to reception of the acceptance message from the charger.

Example 11: The apparatus of example 10, wherein the embedded controller is to service the second interrupt read the Accept bit register.

Example 12: The apparatus of example 11, wherein the embedded controller is to shut off an input current limit of the charger circuitry to bring down power of the apparatus less than or equal to a power threshold.

Example 13: The apparatus of example 9, wherein the second interrupt is a throttle indication to a processor to reduce power consumption by the processor.

Example 14: A machine-readable storage media comprising machine-readable instructions that when executed cause one or more integrated circuits to perform an operation comprising: detecting connection of a charger to a host system via a pull-up or a pull-down termination impedance on one or more communication pins; and closing a switch to couple a first power supply rail with a second power supply rail in response to the detection of connection of the charger, wherein the first power supply rail is coupled to the charger, and wherein the second power supply rail is coupled to a charge circuitry.

Example 15: The machine-readable storage media of example 14 comprising machine-readable instructions that when executed cause the one or more integrated circuits to perform an operation comprising: issuing an interrupt in response to closing the switch; servicing the interrupt after an embedded controller is booted; updating a power status register with a default first power before the embedded controller is booted; reading the power status register to determine power capability of the charger external to the host system; and configure an input current limit of the charger circuitry based on the power capability of the charger to deliver power on the first power supply rail to charge a battery.

Example 16: The machine-readable storage media of example 14 comprising machine-readable instructions that when executed cause the one or more integrated circuits to perform an operation comprising: issuing a low battery signal to a processor to halt boot of the processor in response to detection of the charger, charger power delivery capacity and/or in response to detection of no charge of a battery; or continue booting of the processor in response to detection of the charger, charger power delivery capacity and/or in response to detection of charge of the battery.

Example 17: The machine-readable storage media of example 15, wherein the interrupt is a first interrupt, wherein the machine-readable storage media comprises machine-readable instructions that when executed cause the one or more integrated circuits to perform an operation comprising: receiving power capabilities from the charger on the one or more communication pins; issuing a second interrupt upon reception of an acceptance message from the charger; updating an Accept bit register in response to reception of the acceptance message from the charger; servicing the second interrupt read the Accept bit register; and shutting off an input current limit of the charger circuitry to bring down power of the host system less than or equal to a power threshold.

Example 18: A system comprising: a USB source comprising a charger; and a USB host system comprising a sink comprising: one or more communication pins to couple to a charger; a first a power supply rail to couple to the charger; a charger circuitry; a second power supply rail coupled to the charger circuitry; a power delivery controller to detect connection of the charger via a pull-up or a pull-down termination impedance on the one or more communication pins, wherein the power delivery controller is to close a switch to couple the power supply rail with the second power supply rail in response to the detection of connection of the charger; an embedded controller coupled to the power delivery controller and the charger circuitry; and a processor coupled to the embedded controller and the charger circuitry.

Example 19: The system of example 18, wherein the power delivery controller is to issue an interrupt in response to closing the switch, wherein the embedded controller is to service the interrupt after the embedded controller is booted.

Example 20: The system of example 19, wherein the power delivery controller is to update a power status register with a default first power before the embedded controller is booted.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   one or more communication pins to couple to a charger external to the apparatus;
   a first power supply rail to couple to the charger;
   a charger circuitry;
   a second power supply rail coupled to the charger circuitry; and
   a power delivery controller to detect connection of the charger to the apparatus via a pull-up or a pull-down termination impedance on the one or more communication pins, wherein the power delivery controller is to close a switch to couple the first power supply rail with the second power supply rail in response to the detection of connection of the charger.

2. The apparatus of claim 1, further comprising an embedded controller coupled to the power delivery controller, wherein the power delivery controller is to issue an interrupt in response to closing the switch.

3. The apparatus of claim 2, wherein the embedded controller is to service the interrupt after the embedded controller is booted.

4. The apparatus of claim 3, wherein the power delivery controller is to update a power status register with a default first power before the embedded controller is booted.

5. The apparatus of claim 4, wherein the embedded controller is to read the power status register to determine power capability of the charger external to the apparatus.

6. The apparatus of claim 5, wherein the embedded controller is to configure an input current limit of the charger circuitry based on the power capability of the charger to deliver power on the first power supply rail to charge a battery.

7. The apparatus of claim 6, further comprising a processor coupled to the charger circuitry and the embedded controller, wherein the charger circuitry is to provide power to the processor.

8. The apparatus of claim 2, wherein:
   the embedded controller is to issue a low battery signal to a processor to halt boot of the processor in response to the detection, a charger power delivery capacity and/or a detection of no charge of a battery; or
   the embedded controller is to continue boot of the processor in response to the detection, the charger power delivery capacity and/or a detection of charge of the battery.

9. The apparatus of claim 2, wherein the interrupt is a first interrupt, wherein the power delivery controller is to receive power capabilities from the charger on the one or more communication pins, and wherein the power delivery controller is to issue a second interrupt upon reception of an acceptance message from the charger.

10. The apparatus of claim 9, wherein the power delivery controller is to update an Accept bit register in response to reception of the acceptance message from the charger.

11. The apparatus of claim 10, wherein the embedded controller is to read the Accept bit register based on the second interrupt.

12. The apparatus of claim 11, wherein the embedded controller is to shut off an input current limit of the charger circuitry to bring down power of the apparatus less than or equal to a power threshold.

13. The apparatus of claim 9, wherein the second interrupt is a throttle indication to a processor to reduce power consumption by the processor.

14. A machine-readable storage media comprising machine-readable instructions that when executed cause one or more integrated circuits to perform an operation comprising:
    detecting connection of a charger to a host system via a pull-up or a pull-down termination impedance on one or more communication pins; and
    closing a switch to couple a first power supply rail with a second power supply rail in response to the detection of connection of the charger, wherein the first power supply rail is coupled to the charger, and wherein the second power supply rail is coupled to a charge circuitry.

15. The machine-readable storage media of claim 14, further comprising machine-readable instructions that when executed cause the one or more integrated circuits to perform an operation comprising:
    issuing an interrupt in response to closing the switch;
    servicing the interrupt after an embedded controller is booted;
    updating a power status register with a default first power before the embedded controller is booted;
    reading the power status register to determine a power capability of the charger external to the host system; and
    configuring an input current limit of a charger circuitry based on the power capability of the charger to deliver power on the first power supply rail to charge a battery.

16. The machine-readable storage media of claim 14, further comprising machine-readable instructions that when executed cause the one or more integrated circuits to perform an operation comprising:
    issuing a low battery signal to a processor to halt boot of the processor in response to the detection of the charger, a charger power delivery capacity and/or a detection of no charge of a battery; or
    continue booting of the processor in response to the detection of the charger, the charger power delivery capacity and/or a detection of charge of the battery.

17. The machine-readable storage media of claim 15, wherein the interrupt is a first interrupt, wherein the machine-readable storage media comprises machine-readable instructions that when executed cause the one or more integrated circuits to perform an operation comprising:
    receiving power capabilities from the charger on the one or more communication pins;
    issuing a second interrupt upon reception of an acceptance message from the charger;
    updating an Accept bit register in response to reception of the acceptance message from the charger;
    reading the Accept bit register based on the second interrupt; and
    shutting off the input current limit of the charger circuitry to bring down power of the host system less than or equal to a power threshold.

18. A system comprising:
    a USB source comprising a charger; and
    a USB host system comprising a sink comprising:
        one or more communication pins to couple to a charger;
        a first power supply rail to couple to the charger;
        a charger circuitry;
        a second power supply rail coupled to the charger circuitry;
        a power delivery controller to detect connection of the charger via a pull-up or a pull-down termination impedance on the one or more communication pins, wherein the power delivery controller is to close a switch to couple the first power supply rail with the second power supply rail in response to the detection of connection of the charger;
        an embedded controller coupled to the power delivery controller and the charger circuitry; and
        a processor coupled to the embedded controller and the charger circuitry.

19. The system of claim 18, wherein the power delivery controller is to issue an interrupt in response to closing the switch, wherein the embedded controller is to service the interrupt after the embedded controller is booted.

20. The system of claim 19, wherein the power delivery controller is to update a power status register with a default first power before the embedded controller is booted.

* * * * *